2,722,537
PRODUCTION OF CHLORANIL

John E. Fox, Texas City, Tex., assignor to Monsanto Chemical Company, St. Louis, Mo., a corporation of Delaware No Drawing. Application February 8, 1954, Serial No. 408,990

4 Claims. (Cl. 260—396)

This invention pertains to the preparation of 2,3,5,6-tetrachlorobenzoquinone-1,4 or, as it is more commonly called, chloranil.

Chloranil is used commercially as an oxidizing agent in the preparation of dyes such as methyl violet, and as a fungicide which is particularly useful for the protection of legume seeds. A number of methods may be found in the literature for preparation of this compound, the more common of which are: (1) chlorination of nitroaniline followed by reduction to dichloro-p-phenylene diamine and then simultaneous chlorination and oxidation by potassium chlorate and hydrochloric acid; (2) the reaction of concentrated hydrochloric acid on benzoquinone in the presence of hydrogen peroxide (30%); and, (3) the oxidation of trichlorophenol with chromic acid, or passage of chlorine into 2,4,6-trichlorophenol in sulfuric acid monohydrate and chlorosulfonic acid at 85–90° C. Most of these methods, however, are costly or not too well suited to commercial production on a large scale. In some cases, too, the product as produced is in such an impure state as to require additional purification techniques to render it suitable to meet commercial specifications.

It is an object of the present invention to provide a new and improved process for the production of chloranil.

It is a further object of the invention to provide a new and improved process for the production of chloranil utilizing cyclohexane, a hydrocarbon readily available from refinery operations, as starting material in the synthesis.

Other objects and advantages of the invention will become apparent from the following description.

According to the invention, chloranil is produced by reacting cyclohexane with hydrochloric acid and oxygen in the presence of an oxidation catalyst at a temperature from about 180° to about 260° C. The reaction takes place according to the following equation:

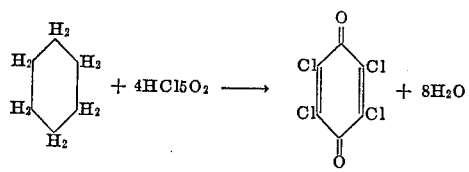

The reaction may be carried out by mixing cyclohexane and hydrogen chloride with oxygen or air and passing the mixture over the catalyst in a heated reaction chamber. If desired, the three reactants may be introduced in separate streams, or the air or oxygen may be introduced into the mixture of cyclohexane and hydrogen chloride. However, care should be taken not to permit the hydrocarbon and oxygen or air to reach reaction temperature in the absence of the hydrogen chloride. The product of the reaction may be readily recovered by condensing the reaction gases downstream of the reactor by means of suitable cooling. The crude product which is thus recovered as a solid material may be readily separated from unreacted cyclohexane by filtration and purified by crystallization.

Generally, stoichiometric quantities of the reactants are employed. Thus, as indicated in the equation above, 4 moles of hydrogen chloride and 5 moles of oxygen are fed for every mole of cyclohexane. A slight excess of oxygen or air is desirable. Excesses of either or both of the other reactants, however, do not adversely affect the reaction, but no advantages are to be gained in the use of either of these reactants in excess. Unreacted cyclohexane may be recycled in the process and thus excellent yields may be obtained.

The use of an oxidation catalyst is essential in order to obtain good yields of chloranil. Generally, all of the oxidation catalysts known in the art are effective, to some degree, for promoting the reaction. To be preferred, however, are the oxides or salts of copper, iron, cobalt, aluminum and bismuth and mixtures thereof. In general, best results are obtained by the use of a copper catalyst which may be in the metallic state or as copper oxide or a copper salt such as the chloride, for example. Preferably, the catalysts are deposited on refractory supports such as pumice, silica gel, alumina gel, porcelain, or the like. An eminently suitable catalyst for the reaction and one with which excellent results have been secured is a mixture of copper chloride, cobalt chloride, and ferric chloride deposited on alumina. Another excellent catalyst is prepared by coprecipitating copper and aluminum hydroxides from solutions of copper and aluminum chlorides, drying the precipitate, breaking up the dried filter cake, and screening the particles to secure preferably a 4–8 mesh size.

Either aqueous hydrochloric acid or anhydrous hydrogen chloride may be employed. Because of the exothermic nature of the reaction, aqueous hydrochloric acid is preferred since the heat capacity of the accompanying water facilitates maintenance of the desired temperature in the reactor.

The oxidative chlorination of cyclohexane may be effected at a temperature within the range from about 180° to about 260° C. Preferably, however, reaction temperature is maintained in the range from about 220° to about 240° C.

The following example will illustrate the principle of the invention but is not to be construed as limiting it in any manner.

Example

A preheater-reactor constructed of 1-in. diameter glass tubing encased in a jacket of 2-in. glass pipe over all of its 6-ft. length was employed in the experiments. A heat transfer agent, such as that known to the trade as "Aroclor," for example, was heated to the desired temperature and continuously circulated through the jacket. The lower 27 inches of the tube was packed with catalyst while the rest of the tube was packed with glass helices. The catalyst was prepared by impregnating 4–8 mesh alumina with a solution of salts in the following approximate proportions by weight:

| | Percent |
|---|---|
| $CuCl_2 \cdot 2H_2O$ | 79.5 |
| $CoCl_2 \cdot 6H_2O$ | 15.8 |
| $FeCl_3 \cdot 6H_2O$ | 4.7 |

The deposited salts, after drying, represented about 18% of the total weight of the catalyst.

The reactants were fed into the top section of the reactor where they were preheated to the temperature of the circulating heat medium maintained at about 233° C.

and thence through the catalyst bed. Feed rates at standard conditions were as follows:

Aqueous HCl 2.0 ml./min.=462 ml./min. anhydrous gas
Cyclohexane 1.0 ml./min.=207 ml./min. gas
Air 2750 ml./min.

The reaction gases leaving the bottom of the reactor were condensed by means of cold traps. The crystalline solid was collected and recrystallized twice from ethyl alcohol. The melting point of the thus purified material was found to be 282–283.5° C., as compared to the value of 283–285° C. given in the literature and specified for the commercial product. Identification was verified by means of the ultraviolet spectrum of the compound. Positive qualitative color tests for the quinone structure were obtained when the product was warmed with dimethyl aniline or treated with several drops of ethyl cyanoacetate in alcoholic $NH_4OH$. The product had the following analysis:

|  | Percent C | Percent H | Percent Cl | Percent O |
|---|---|---|---|---|
| Calculated for $C_6Cl_4O_2$ | 29.30 | 0.00 | 57.68 | 13.01 |
| Found | 29.33 | 0.26 | 57.51 | 12.91 |

The high purity of the product was evidenced by the fact that the characteristic yellow band developed by passage through a chromatographic adsorption column packed with silicic acid traveled the entire length of the column without separation.

What is claimed is:

1. A process for the production of chloranil which comprises reacting cyclohexane with hydrogen chloride and oxygen in the presence of an oxidation catalyst chosen from the group consisting of the oxides and salts of copper, iron, bismuth, cobalt, and aluminum and mixtures thereof at a temperature within the range from about 180° C. to about 260° C.

2. A process for the production of chloranil which comprises reacting cyclohexane with hydrogen chloride and oxygen in the presence of an oxidation catalyst chosen from the group consisting of the oxides and salts of copper, iron, bismuth, cobalt, and aluminum and mixtures thereof at a temperature within the range from about 220° to about 240° C.

3. A process for the production of chloranil which comprises reacting one mole of cyclohexane with four moles of hydrogen chloride and five moles of oxygen in the presence of an oxidation catalyst chosen from the group consisting of the oxides and salts of copper, iron, bismuth, cobalt and aluminum and mixtures thereof at a temperature within the range from about 220° to about 240° C.

4. A process for the production of chloranil which comprises reacting one mole of cyclohexane with four moles of hydrogen chloride and five moles of oxygen in the presence of an oxidation catalyst comprising copper chloride, cobalt chloride and ferric chloride deposited on alumina at a temperature within the range from about 220° to about 240° C.

No references cited.